United States Patent
Miller

(10) Patent No.: US 9,686,801 B2
(45) Date of Patent: *Jun. 20, 2017

(54) METHOD AND APPARATUS FOR COORDINATING A RADIO NETWORK CONTROLLER AND NODE B RESOURCE MANAGEMENT FOR HIGH SPEED DOWNLINK PACKET DATA SERVICE

(71) Applicant: InterDigital Technology Corporation, Wilmington, DE (US)

(72) Inventor: James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/965,702

(22) Filed: Aug. 13, 2013

(65) Prior Publication Data

US 2013/0329698 A1 Dec. 12, 2013

Related U.S. Application Data

(63) Continuation of application No. 10/321,308, filed on Dec. 17, 2002, now Pat. No. 8,619,718.

(60) Provisional application No. 60/370,739, filed on Apr. 5, 2002.

(51) Int. Cl.
*H04B 7/216* (2006.01)
*H04W 72/08* (2009.01)
*H04W 28/26* (2009.01)
*H04W 72/04* (2009.01)

(52) U.S. Cl.
CPC ......... *H04W 72/085* (2013.01); *H04W 28/26* (2013.01); *H04W 72/0433* (2013.01)

(58) Field of Classification Search
CPC . H04W 28/26; H04W 36/023; H04W 72/085; H04W 72/0433; H04W 72/1242
See application file for complete search history.

(56) References Cited

U.S. PATENT DOCUMENTS

| 5,224,098 A | 6/1993 | Bird et al. |
| 6,160,839 A | 12/2000 | Zhang |
| 6,272,119 B1 | 8/2001 | Kage |
| 6,317,598 B1 | 11/2001 | Wiesen et al. |
| 6,327,255 B1 | 12/2001 | Kage |
| 6,341,225 B1 | 1/2002 | Blanc |

(Continued)

FOREIGN PATENT DOCUMENTS

| CN | 1361636 | 8/2002 |
| CN | 1416282 | 5/2003 |

(Continued)

OTHER PUBLICATIONS

Phillips, "Performance of ACK/NACK signaling", R1-1-1198, TSG-RAN WG1 #22, Nov. 23, 2001.*

(Continued)

*Primary Examiner* — Brian O'Connor
(74) *Attorney, Agent, or Firm* — Volpe and Koenig, P.C.

(57) ABSTRACT

The architecture of the high-speed shared service provides a Node B yielding various sets of information that answer a set of basic questions that a data service needs. Many potential measurements the Node B can make are provided to the RNC to enable a resource manager to perform certain functions and which can be used to answer the set of basic questions.

16 Claims, 3 Drawing Sheets

(56) References Cited

U.S. PATENT DOCUMENTS

| | | | |
|---|---|---|---|
| 6,353,638 B1 | 3/2002 | Hottinen et al. | |
| 6,374,112 B1 | 4/2002 | Widegren et al. | |
| 6,426,960 B2 | 7/2002 | Antonio | |
| 6,445,917 B1 | 9/2002 | Bark et al. | |
| 6,519,461 B1 | 2/2003 | Andersson et al. | |
| 6,647,477 B2 | 11/2003 | Janoska et al. | |
| 6,665,283 B2* | 12/2003 | Harris et al. | 370/333 |
| 6,708,041 B1 | 3/2004 | Butovitsch et al. | |
| 6,717,927 B2 | 4/2004 | Chao et al. | |
| 6,738,624 B1 | 5/2004 | Aksentijevic et al. | |
| 6,771,965 B2 | 8/2004 | Hamabe | |
| 6,914,889 B1 | 7/2005 | Bi et al. | |
| 6,934,268 B1 | 8/2005 | Hedlund et al. | |
| 6,934,556 B2 | 8/2005 | Takano | |
| 6,963,544 B1 | 11/2005 | Balachandran et al. | |
| 6,996,083 B1 | 2/2006 | Balachandran et al. | |
| 7,010,318 B2 | 3/2006 | Chang et al. | |
| 7,027,420 B2 | 4/2006 | Hamalainene | |
| 7,054,633 B2 | 5/2006 | Seo et al. | |
| 7,106,704 B2 | 9/2006 | Marjelund et al. | |
| 7,197,021 B2 | 3/2007 | Seo et al. | |
| 7,197,317 B2 | 3/2007 | Parkvall et al. | |
| 7,227,850 B2 | 6/2007 | Dahlman et al. | |
| 7,317,700 B2* | 1/2008 | Hwang | 370/328 |
| 7,379,478 B1 | 5/2008 | Mantha | |
| 7,433,337 B2* | 10/2008 | Chao et al. | 370/331 |
| 7,453,845 B2 | 11/2008 | Cha et al. | |
| 7,463,600 B2 | 12/2008 | Tong et al. | |
| 8,619,718 B2* | 12/2013 | Miller | 370/335 |
| 2001/0018342 A1 | 8/2001 | Vialen et al. | |
| 2002/0075828 A1 | 6/2002 | Jang et al. | |
| 2002/0082023 A1 | 6/2002 | Bark et al. | |
| 2002/0094833 A1 | 7/2002 | Lieshout et al. | |
| 2003/0103496 A1 | 6/2003 | Narayanan et al. | |
| 2003/0153323 A1* | 8/2003 | Hwang | 455/450 |
| 2004/0146033 A1 | 7/2004 | Soderstrom et al. | |
| 2005/0063347 A1 | 3/2005 | Sarkkinen et al. | |

FOREIGN PATENT DOCUMENTS

| | | |
|---|---|---|
| JP | 2002-533987 | 10/2002 |
| JP | 2003/513531 | 4/2003 |
| JP | 2003-143653 | 5/2003 |
| JP | 2003-518812 | 6/2003 |
| WO | 99/37114 | 7/1999 |
| WO | 99/41925 | 8/1999 |
| WO | 99/55110 | 10/1999 |
| WO | 00/13447 | 3/2000 |
| WO | 00/38351 | 6/2000 |
| WO | 00/70897 | 11/2000 |
| WO | 01/54299 | 7/2001 |
| WO | 01/63851 | 8/2001 |
| WO | 01/91389 | 11/2001 |
| WO | 02/30134 | 4/2002 |
| WO | 02/096044 | 11/2002 |

OTHER PUBLICATIONS

3GPP, "3$^{rd}$ Generation Partnership Project; Technical Specification Group Radio Access Network; High Speed Dowlink Packet Access; Overall UTRAN Description (Release 5)," 3GPP 25.855 V5.0.0 (Sep. 2001).

3GPP, "3$^{rd}$ Generation Partnership Project; Technical Specification Group Radio Access Network; UTRAN lub Interface NBAP Signalling (Release 4)," 3GPP TS 25.433 V4.4.0 (Mar. 2002).

3GPP, "3$^{rd}$ Generation Partnership Project; Technical Specification Group Radio Access Network; UTRAN lub Interface NBAP Signalling (Release 1999)," 3GPP TS 25.433 V3.9.0 (Mar. 2002).

3GPP, "3$^{rd}$ Generation Partnership Project; Technical Specification Group Radio Access Network; UTRAN lub Interface NBAP Signalling (Release 1999)," 3GPP TS 25.433 V3.11.0 (Sep. 2002).

3GPP, "3$^{rd}$ Generation Partnership Project; Technical Specification Group Radio Access Network; UTRAN lub Interface NBAP Signalling (Release 4)," 3GPP TS 25.433 V4.6.0 (Sep. 2002).

3GPP, "3$^{rd}$ Generation Partnership Project; Technical Specification Group Radio Access Network; UTRAN lub Interface NBAP Signalling (Release 4)," 3GPP TS 25.433 V5.0.0 (Mar. 2002).

3GPP, "3$^{rd}$ Generation Partnership Project; Technical Specification Group Radio Access Network; UTRAN lub Interface NBAP Signalling (Release 5)," 3GPP TS 25.433 V5.2.0 (Sep. 2002).

3GPP, "3$^{rd}$ Generation Partnership Project; Technical Specification Group Radio Access Network; UTRAN lur interface signaling transport (Release 5)," 3GPP TS 25.422 V5.1.0 (Sep. 2002).

3GPP, "3$^{rd}$ Generation Partnership Project; Technical Specification Group Radio Access Network; UTRAN lur interface signaling transport (Release 5)," 3GPP TS 25.422 V5.0.0 (Mar. 2002).

3GPP, "3$^{rd}$ Generation Partnership Project; Technical Specification Group Radio Access Network; UTRAN lur interface signaling transport (Release 4)," 3GPP TS 25.422 V4.2.0 (Sep. 2002).

3GPP, "3$^{rd}$ Generation Partnership Project; Technical Specification Group Radio Access Network; UTRAN lur interface signaling transport (Release 4)," 3GPP TS 25.422 V4.1.1 (Mar. 2002).

3GPP, "3$^{rd}$ Generation Partnership Project; Technical Specification Group Radio Access Network; UTRAN lur interface signaling transport (Release 1999)," 3GPP TS 25.422 V3.6.0 (Mar. 2002).

3GPP, "3$^{rd}$ Generation Partnership Project; Technical Specification Group Terminals; Common Test Environments for User Equipment (UE) Conformance Testing (Release 1999)," 3GPP TS 34.108 V3.7.1 (Mar. 2002).

3GPP, "3$^{rd}$ Generation Partnership Project; Technical Specification Group Terminals; Common Test Environments for User Equipment (UE) Conformance Testing (Release 1999)," 3GPP TS 34.108 V3.8.1 (Sep. 2002).

3GPP, "3$^{rd}$ Generation Partnership Project; Technical Specification Group Terminals; Common Test Environments for User Equipment (UE) Conformance Testing (Release 4)," 3GPP TS 34.108 V4.2.1 (Mar. 2002).

3GPP, "3$^{rd}$ Generation Partnership Project; Technical Specification Group Terminals; Common Test Environments for User Equipment (UE) Conformance Testing (Release 4)," 3GPP TS 34.108 V4.4.0 (Sep. 2002).

3GPP, "3$^{rd}$ Generation Partnership Project; Technical Specification Group Radio Access Network; Requirements for support of radio resource management (FDD) (Release 1999)," 3GPP TS 25.133 V3.9.0 (Mar. 2002).

3GPP, "3$^{rd}$ Generation Partnership Project; Technical Specification Group Radio Access Network; Requirements for support of radio resource management (FDD) (Release 1999)," 3GPP TS 25.133 V3.11 (Sep. 2002).

3GPP, "3$^{rd}$ Generation Partnership Project; Technical Specification Group Radio Access Network; Requirements for support of radio resource management (FDD) (Release 4)," 3GPP TS 25.133 V4.4.0 (Mar. 2002).

3GPP, "3$^{rd}$ Generation Partnership Project; Technical Specification Group Radio Access Network; Requirements for support of radio resource management (FDD) (Release 4)," 3GPP TS 25.133 V4.6.0 (Sep. 2002).

3GPP, "3$^{rd}$ Generation Partnership Project; Technical Specification Group Radio Access Network; Requirements for support of radio resource management (FDD) (Release 5)," 3GPP TS 25.133 V5.2.0 (Mar. 2002).

3GPP, "3$^{rd}$ Generation Partnership Project; Technical Specification Group Radio Access Network; Requirements for support of radio resource management (FDD) (Release 5)," 3GPP TS 25.133 V5.4.0 (Sep. 2002).

3GPP, "3$^{rd}$ Generation Partnership Project; Technical Specification Group Radio Access Network; High Speed Downlink Packet Access; Overall UTRAN Description (Release 5)" 3GPP 25.855 V2.0.0 (Sep. 2001).

3GPP, "3$^{rd}$ Generation Partnership Project; Technical Support Group Radio Access Network; MAC Protocol Specification (Release 1999)," 3GPP TS 25.321 v3.11.0 (Mar. 2002).

(56) References Cited

OTHER PUBLICATIONS

3GPP, "3rd Generation Partnership Project; Technical Support Group Radio Access Network; MAC Protocol Specification (Release 1999)," 3GPP TS 25.321 v3.13.0 (Sep. 2002).

3GPP, "3rd Generation Partnership Project; Technical Support Group Radio Access Network; MAC Protocol Specification (Release 4)," 3GPP TS 25.321 v4.4.0 (Mar. 2002).

3GPP, "3rd Generation Partnership Project; Technical Support Group Radio Access Network; MAC Protocol Specification (Release 4)," 3GPP TS 25.321 v4.6.0 (Sep. 2002).

3GPP, "3rd Generation Partnership Project; Technical Support Group Radio Access Network; MAC Protocol Specification (Release 5)," 3GPP TS 25.321 v5.0.0 (Mar. 2002).

3GPP, "3rd Generation Partnership Project; Technical Support Group Radio Access Network; MAC Protocol Specification (Release 5)," 3GPP TS 25.321 v5.2.0 (Sep. 2002).

ETSI TS 125 308, "Universal Mobile Telecommunications System (UMTS); UTRA High Speed Downlink Packet Access (HSPDA); Overall Description; Stage 2", (3GPP TS 25.308 version 5.2.0 Release 5), V5.2.0, Mar. 2002.

Jinzhao et al., "The Mobility Management Functions and Realization Scenario Within RNC", Chongqing University of Post and Telecommunications, Chongqing 400065 (Feb. 2000).

Nokia, "Power offset for uplink ACK/NAK," TSG-RAN WG1 #23, R1-02-0013 (Jan. 8-11, 2002).

3GPP, "3rd Generation Partnership Project; Technical Specification Group Radio Access Network; Spreading and modulation (FDD) (Release 5)," 3G TS 25.213 V5.0.0 (Mar. 2002).

3GPP, "3rd Generation Partnership Project; Technical Specification Group Radio Access Network; Spreading and modulation (FDD) (Release 5)," 3GPP TS 25.213 V5.2.0 (Sep. 2002).

3GPP, "3rd Generation Partnership Project; Technical Specification Group Radio Access Network; Radio Resource Control (RRC); Protocol Specification (Release 5)," 3GPP TS 25.331 V5.0.0 (Mar. 2002).

3GPP, "3rd Generation Partnership Project; Technical Specification Group Radio Access Network; Radio Resource Control (RRC); Protocol Specification (Release 5)," 3GPP TS 25.331 V5.2.0 (Sep. 2002).

* cited by examiner

METHOD AND APPARATUS FOR
COORDINATING A RADIO NETWORK
CONTROLLER AND NODE B RESOURCE
MANAGEMENT FOR HIGH SPEED
DOWNLINK PACKET DATA SERVICE

CROSS REFERENCE TO RELATED
APPLICATIONS

This application is a continuation U.S. patent application Ser. No. 10/321,308 filed Dec. 17, 2002, which claims the benefit of U.S. Provisional Patent application No. 60/370,739, filed on Apr. 5, 2002, the contents of which are hereby incorporated by reference herein.

FIELD OF INVENTION

The inventor relates to radio resource management in a wireless communication system. More particularly the invention relates to communication of data necessary for resource management in high speed downlink packet access service.

BACKGROUND OF THE INVENTION

In $3^{rd}$ generation cellular systems for TDD and FDD almost all resources are fully allocated and controlled by the Controlling Radio Network Controller (C-RNC) that controls the Node B radio resources. For Dedicated Channels (DCH) the C-RNC allocates a fixed amount of resources from the resource pool and assigns it to service the DCH. An example of a DCH service is voice services. For data type services, the CRNC can allocate Downlink Shared Channels (DSCH). Examples of a DSCH service are data services such as Web download, file transfer protocol (Ftp) services or e-mail. Multiple users share this channel over time, and the scheduling of this channel, for example, which user gets access to the channel, is performed in the C-RNC.

These resources are managed by the C-RNC which can decide how much of the resources of a cell is allocated to DCH services and how much is allocated to DSCH services because each resource can only serve one type of service (DCH or DSCH) at a single moment, however resources can be moved back and forth between the two resource pools as is needed.

An additional complexity occurs in the resource allocation of the DSCH in the C-RNC since it is a shared resource that handles multiple services of variable data rates. The maximum amount of resources that are requested by the sum of the users can frequently exceed the amount of the resources in the pool allocated to this type of service. This is possible since all users statistically will not want to transmit at its highest allowed rate simultaneously. Therefore, data service users need to be monitored to determine not only that the radio resources are utilized efficiently but also that the users are not excessively over-provisioned on the available resource, since either condition would cause the users Quality of Service (QoS) to deteriorate.

The C-RNC must answer the following general questions to have optimal knowledge of the operation of the high-speed downlink packet access (HSDPA) service. The first question is, how well is the QoS requirement fulfilled for each user? Particularly, it would need to determine whether all of the operational parameters are set to optimal levels for both the shared and dedicated services. The second question is how well are the overall resources utilized by the two types of services (dedicated and shared service)? Is there an optimal resource split between dedicated and shared services given the current usage/demand of each service?

Yet another question is how much does it cost the overall system performance by adding a user of certain QoS requirement to the cell? This is particularly an issue for shared services where the service rates a user really needs are usually variable over time and the resource allocated to the user is usually over-provisioned.

In most services the C-RNC can readily answer these questions. For a particular user with dedicated service, the C-RNC allocates a fixed amount of resources since the amount of resource used by the user is pretty static over time. For a user of variable data rates with shared service, the C-RNC has enough information to understand how well resources are being used among the users.

However, the High Speed Downlink Packet Access (HSDPA) service uses a new channel; a High Speed Downlink Shared Channel (HS-DSCH) to provide higher data rates for data services than the DSCH. The HS-DSCH service is based on the Node B more dynamically adapting the transmission to better service the users that have data to be transmitted. Therefore the C-RNC no longer schedules the data to be transmitted at a particular moment or the actual resources used for that transmission. The C-RNC basically assigns a given amount of power and the resources in the data resource pool to the Node B and the Node B dynamically schedules the users' data based on current radio conditions.

The consequences of this architecture change in the functionality of data services in the C-RNC leaves it without some of the basic information it has had for other services. Consequently, questions asked before such as: (1) how well the QoS has been fulfilled; (2) the overall resource utilization; and (3) the effect of adding a user to the system, can not be completely answered.

SUMMARY OF THE INVENTION

The architecture of the high-speed shared service means that the Node B has various sets of information that answer the three (3) sets of basic questions that a data service would need to have answered. The present invention provides an HSDPA-capable Node B with a scheduler providing information enabling a resource manager to efficiently allocate resources.

BRIEF DESCRIPTION OF THE FIGURES

The present invention will be understood from a consideration of the figures, wherein like elements are designated by like numerals and wherein.

DETAILED DESCRIPTION OF THE
PREFERRED EMBODIMENTS

High speed downlink packet data access (HSDPA) has been provided to increase capacity, reduce round-trip delay and increase peak data rates through a high speed down link shared channel (HS-DSCH). In addition, (3) fundamental technologies which are tightly coupled and rely on the rapid adaptation of the transmission parameters to instantaneous radio conditions include:

(a) fast link adaptation technology enabling the use of modifications in modulation responsive to channel conditions such as fading peak and fading dip;

(b) fast hybrid automatic-repeat-request (ARQ) technology for rapidly requesting retransmission of missing data entities and combining soft information from original transmission and any subsequent retransmissions before any attempts are made to decode the message; and (c) fast scheduling of users sharing the HS-DSCH which, through multi-user diversity is able to transmit the users with favorable radio conditions.

The technologies employed by HSDPA utilized rapid adaptation of transmission of parameters to match channel conditions and functions such as fast link adaptation and fast scheduling are thus placed close to the air interface, namely at the Node B, causing parts of the functionality previously performed at the radio network controller (RNC) to be moved to the Node B, forming a new Node B entity, MAC-HSDPA. Extending the features of the Node B in this manner provides a highly reliable channel that supports high data rates.

Figure 1:
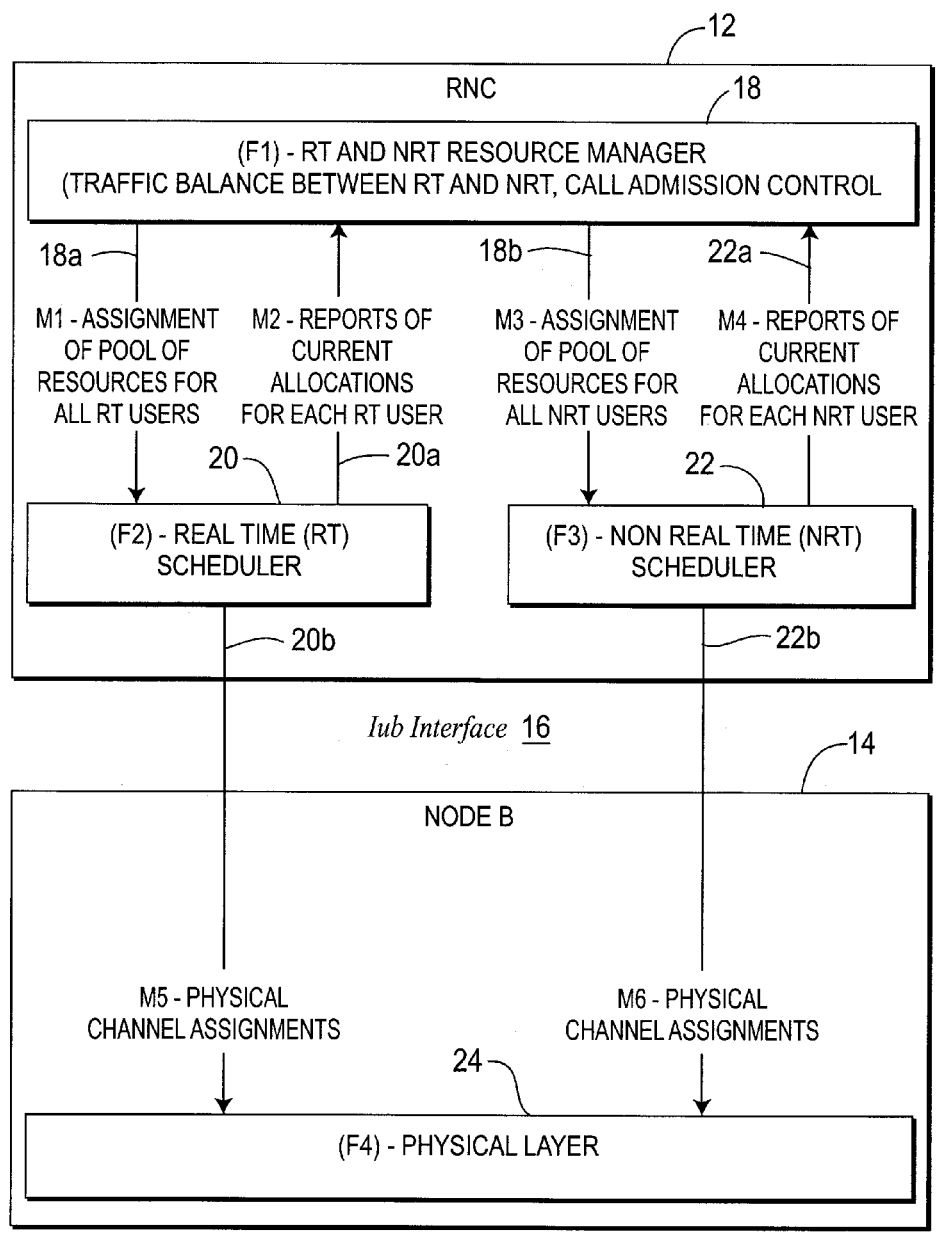
FIGS. 1 and 2 are diagrams showing a radio network controller (RNC) interfaced with a Node B wherein FIG. 1 lacks a high-speed, downlink shared channel (HS-DSCH) and FIG. 2 has an HS-DSCH channel.
Figure 2:
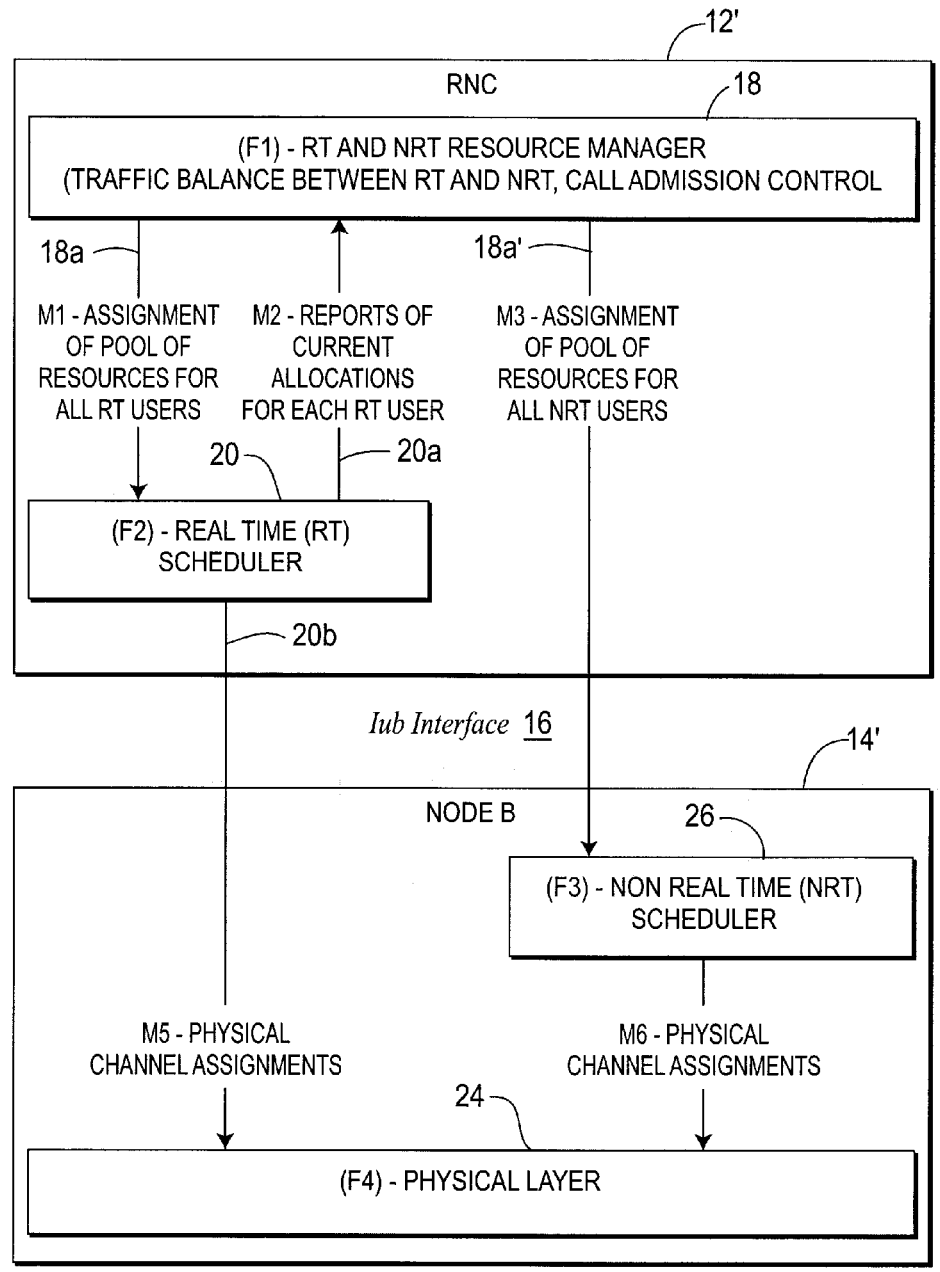
Figure 3:
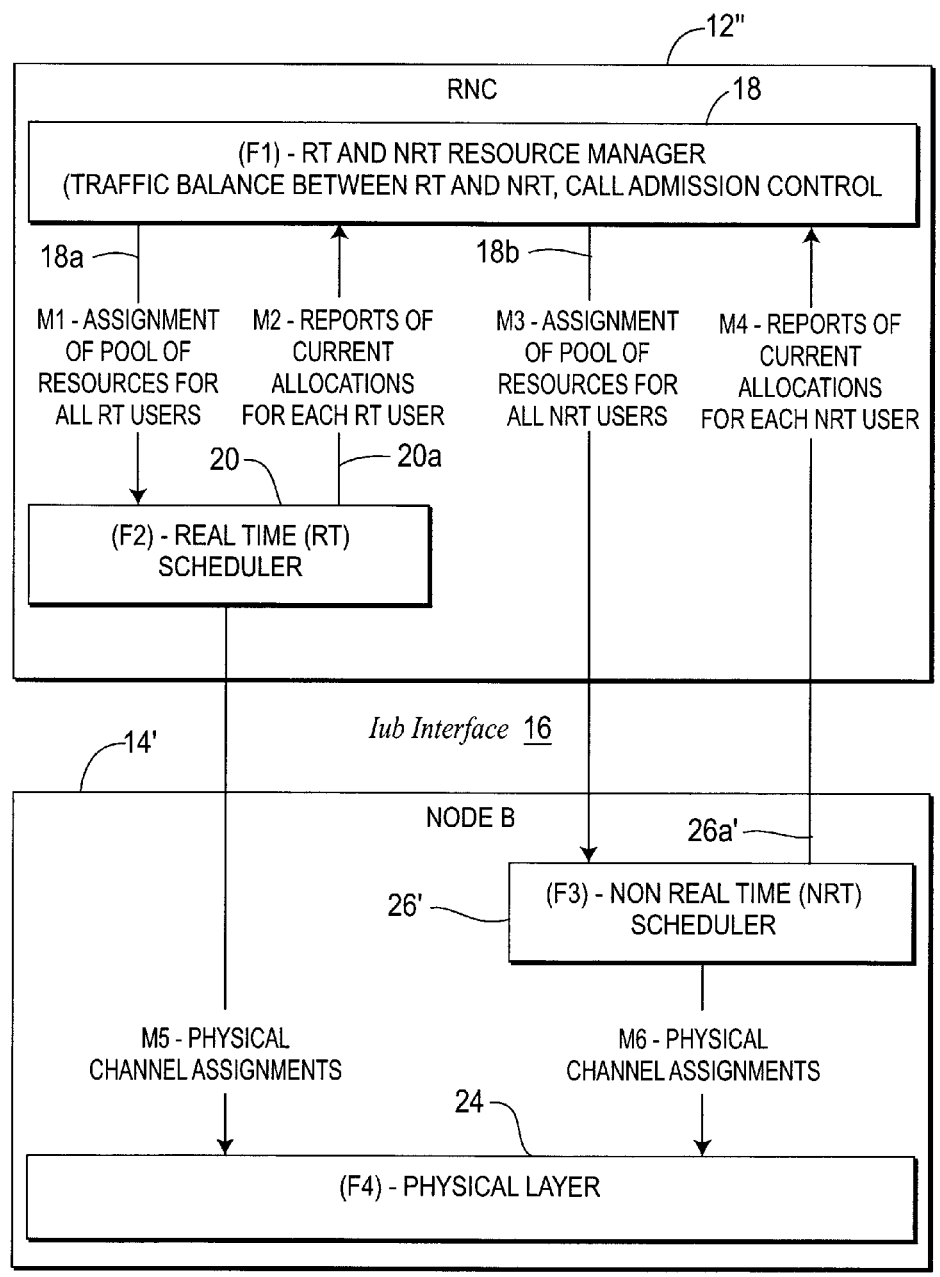
FIG. 3 shows an RNC interface with a Node B having an HS-DSCH channel and embodying the principles of the present invention.

FIGS. 1-3 show a typical implementation and the various message flows necessary for proper radio resource management (RRM) functionality. FIG. 1 is a diagram showing the related art before HSDPA was created. FIG. 2 is a diagram showing the related art interacting with the HSDPA changes. FIG. 3 is a diagram showing correct functionality employing the concept of the present invention.

FIG. 1 shows an RNC 12 and Node B 14, and some of the high level functions and messaging necessary for proper functionality of RRM allocation of real time (RT) and non-real time (NRT) services. The defined functions and messaging within a Node (RNC or Node B) is highly dependent on implementation. Within a node, the labeled functions can be performed by separate processors, or can be within a combined task performing the tasks of more than one function and the tasks that perform these functions may perform other functions unrelated to this invention. Between the RNC 12 and Node B 14 is the standardized Iub interface 16, and thus the messaging is formally defined within the appropriate standards.

Function 1 (F1) is the RT and NRT Resource manager 18. This function performs the traffic balance functions giving out the pool of resources to real time (RT) and non-real time (NRT) functions plus performing the call admission control function, which determines, given the current load, whether the cell can accommodate a new user of a particular type, data rate and QoS attributes.

Function 2 (F2) is the Real Time Scheduler 20. The real time scheduler 20 is responsible for assigning resources to real time subscribers like voice users. Given the type of traffic, the allocations are usually static once assigned.

Function 3 (F3) is the Non-Real Time Scheduler 22. The non-real time scheduler is responsible for assigning resources for each burst of data for non-real time users. Given the type of traffic, the allocations are relatively frequent and many would occur for the typical non-real time call.

Function 4 (F4) is the Physical Layer 24. Layer 24 performs all of the physical air interface functions to properly send the user's data over the air interface. The resources used for each transmission are assigned by the Real Time or Non-Real Time schedulers.

Each of the functions F1 to F3 communicate to each of the other functions F1 to F3 using some type of message sets. These sets can be formally defined by the standards (e.g. message sets that travel over the Iub interface) or can be internally defined and thus implementation specific. In fact, in an implementation using a single task performing more than one function, the communication can be trivial. It should be noted, however, that this implementation just concerns the logical messages that need to be passed between functions. It should also be noted that these functions, even if implemented in software exactly as described in the figures, will have other message sets that they will need to exchange with other functions including those which are outside of the scope of this invention.

Message Set 1 (M1) 18a is the set of messages that are used so that the RT and NRT Resource manager can assign a pool of current resources for RT calls so that the Real time scheduler (F2) has the information it needs.

Message Set 2 (2) 20a is the set of messages that are used so that the RT and NRT Resource Manager can know the current allocations to the RT users. Given that RT allocations are usually static, these messages are trivial unless severe congestion exists.

Message Set 3 (M3) 18b is the set of messages that are used so that the RT and NRT Resource manager 18 can assign a pool of current resources for all NRT allocations so that the Non-Real time scheduler (F3) has the information it needs so that it can allocate resources.

Message Set 4 (M4) 22a is the set of messages that are used so that the RT and NRT Resource manager 18 can know the current allocations (i.e. the results or measurements of the allocations) to the NRT users. Since resources are assigned periodically due to bursty traffic, this feedback is important so that the RT and NRT Resource Manager 18 can alleviate any congestion caused by a temporary (or even more than temporary) congestion due to over-subscription.

Message Set 5 (M5) 20b is the set of messages to tell the layer one (physical layer) about the allocation of resources to a user for RT services.

Message Set 6 (M6) 22b is the set of messages to tell the layer one (physical layer) about the allocation of resources to a user for NRT services.

FIG. 2, it should be noted that the M1-M4 message sets are internal to the RNC since the RT and NRT Resource Manager and the RT and NRT schedulers are also located in the RNC. The message sets M5 and M6 are sent as part of standardized Iub messages.

The diagram of FIG. 2 shows the addition of the HS-DSCH channels to handle NRT services. Note that for the new HS-DSCH the Non Real time scheduler 26 is moved to the Node B, and message set 3 (18a) is now sent over the standardized Iub interface and note that Message set 4 is omitted. This means that the RT and NRT Resource manager does not have any feedback from the Non Real Time Scheduler to allow it to balance traffic between RT and NRT service or provide input into the call admission control functions involving NRT services.

The diagram of FIG. 3 shows the HS-DSCH incorporating the present invention. The new messages M4, 26a.sup.1 defined over the standardized Iub interface would allow for the RT and NRT Resource manager to get feedback to provide proper traffic balancing and call admission control. The new message set M4 will be defined in a similar manner as other physical layer measurements in the Node B, which is prior art. As per the prior art, the CRNC can schedule the reporting and desired averaging over time to fulfill its needs.

As was pointed out above, examples of the basic questions that the data service needs to answer, one example is how well is the quality of service (QoS) fulfilled? In this aspect the Node B knows how many times it attempted to transmit data until it was successfully received and thus knows the actual rate data was transmitted at any one time. This is a different value than the data actually transmitted by a user since a transmission that has to be retried several times will take up capacity of the channel each time it is transmitted even though the user has sent the data only once and thus only counts once in determining how the user's QoS is fulfilled. The present invention however, provides the required information.

Additionally, it knows other things such as the total power used by the high speed data service compared to the power used by other services offered by the cell, which is an additional factor in knowing how efficiently the allocated power is being used vs. the amount of data processed. There are many other potential measurements that the Node B can make that are useful in determining the quality of the high speed data service. One example is the reliability of the received positive or negative acknowledgements sent by the user to the Node B when data is received correctly or incorrectly.

Other questions that this type of data can answer are:
(a) How well are the overall resources utilized by the two types of services?
(b) Are the resources split optimally between dedicated and data services given the current usage/demand of each service? The Node B for this question knows how efficiently the users data was transmitted. For example, one Node B that has more retransmissions than another Node B can not handle as much user data as the other Node B is able to do.
(c) How much does it cost the overall system performance by adding a user of a certain QoS requirement to the cell? The Node B, to answer this question, can estimate the available resources that are available to a new user given the answers above on the overall resource utilization.

Therefore, since the Node B has all of this information which is necessary to perform these functions, and given that it is not efficient to make an architectural change to move all of the C-RNC resource allocation to the Node B for both dedicated and all data services, it is extremely valuable that the Node B must report these parameters to the C-RNC to allow the C-RNC to incorporate this information together with other information it has on DCH and DSCH resources to allow it to make optimal resource allocation decisions. A list of the potential information would be desirable to pass from the Node B to the C-RNC measured either for the cell in its entirety or by the priority class of the user is: the amount of data successfully transmitted per unit time in a measure such as the number of blocks of data or the size of the actual data transmitted. Also included in the list are: the number of successful transmissions; successful in the first transmission; successful in the second transmission; successful in the third transmission; the number of unsuccessful transmissions; abandoned in the first transmission; abandoned in the second transmission; abandoned in the third transmission; total failures; usage of each modulation scheme; performance of soft handover situations vs. normal situations; ACK/NAK reception quality errors; and power usage for HSDPA transmissions.

Although the present invention has been described in detail, it is to be understood that the invention is not limited thereto, and that various changes can be made therein without departing from the spirit and scope of the invention, which is defined by the attached claims.

The invention claimed is:

1. A method for reporting measurements to a radio network controller (RNC) and scheduling downlink transmissions for high speed packet data services, the method comprising:
   a Node B performing measurements including a first total power level used for downlink transmissions for high speed packet data services in a cell and a second total power level used for downlink transmissions for non-high speed packet data services in the cell;
   the Node B sending a report including the first total power level or the second total power level to the RNC;
   the Node B receiving resource allocation for the high speed packet data services from the RNC; and
   the Node B scheduling downlink transmissions for the high speed packet data services within the received resource allocation.

2. The method of claim 1, wherein the first total power level includes power associated with a high speed downlink shared channel (HS-DSCH).

3. The method of claim 1 wherein the report further includes at least one of an amount of data successfully transmitted per unit time, a number of blocks of data and a size of actual data transmitted, a number of successful transmissions, a number of unsuccessful transmissions, a number of abandoned transmissions, or a number of total failures.

4. The method of claim 1 wherein the report further includes at least one of usage of each modulation scheme, performance of soft handover situations relative to normal situations, a number of acknowledge/non-acknowledge reception errors, or power usage for calculation of power usage of high speed downlink packet access (HSDPA) transmissions vs. all other services.

5. A method for allocating resources for downlink transmissions for high speed packet data services, the method comprising:
   a radio network controller receiving a report from a Node B including a first total power level used for downlink transmissions for high speed packet data services in a cell and a second total power level used for downlink transmissions for non-high speed packet data services in the cell; and
   the RNC sending resource allocation for the high speed packet data services to the Node B.

6. The method of claim 5, wherein the first total power level includes power associated with a high speed downlink shared channel (HS-DSCH).

7. The method of claim 5 wherein the report further includes at least one of an amount of data successfully transmitted per unit time, a number of blocks of data and a size of actual data transmitted, a number of successful transmissions, a number of unsuccessful transmissions, a number of abandoned transmissions, or a number of total failures.

8. The method of claim 5 wherein the report further includes at least one of usage of each modulation scheme, performance of soft handover situations relative to normal situations, a number of acknowledge/non-acknowledge reception errors, or power usage for calculation of power usage of high speed downlink packet access (HSDPA) transmissions versus all other services.

9. A Node B configured to report measurements to a radio network controller (RNC) and schedule downlink transmissions for high speed packet data services, the Node B comprising:
at least one processor;
an interface operatively coupled to the at least one processor;
the at least one processor is configured to perform measurements including a first total power level used for downlink transmissions for high speed packet data services in a cell and a second total power level used for downlink transmissions for non-high speed packet data services in the cell;
the at least one processor and the interface are configured to send a report including the first total power level or the second total power level to the RNC;
the at least one processor and the interface are further configured to receive resource allocation for the high speed packet data services from the RNC; and
the at least one processor is further configured to schedule downlink transmissions for the high speed packet data services within the received resource allocation.

10. The Node B of claim 9, wherein the first total power level includes power associated with a high speed downlink shared channel (HS-DSCH).

11. The Node B of claim 9 wherein the report further includes at least one of an amount of data successfully transmitted per unit time, a number of blocks of data and a size of actual data transmitted, a number of successful transmissions, a number of unsuccessful transmissions, a number of abandoned transmissions, or a number of total failures.

12. The Node B of claim 9 wherein the report further includes at least one of usage of each modulation scheme, performance of soft handover situations relative to normal situations, a number of acknowledge/non-acknowledge reception errors, or power usage for calculation of power usage of high speed downlink packet access (HSDPA) transmissions vs. all other services.

13. A radio network controller (RNC) configured to allocate resources for downlink transmissions for high speed packet data services, the RNC comprising:
at least one processor;
an interface operatively coupled to the at least one processor;
the at least one processor and the interface are configured to receive a report from a Node B including a first total power level used for downlink transmissions for high speed packet data services in a cell and a second total power level used for downlink transmissions for non-high speed packet data services in the cell; and
the at least one processor and the interface are further configured to send a resource allocation for the high speed packet data services to the Node B.

14. The RNC of claim 13, wherein the first total power level includes power associated with a high speed downlink shared channel (HS-DSCH).

15. The RNC of claim 13 wherein the report further includes at least one of an amount of data successfully transmitted per unit time, a number of blocks of data and a size of actual data transmitted, a number of successful transmissions, a number of unsuccessful transmissions, a number of abandoned transmissions, or a number of total failures.

16. The RNC of claim 13 wherein the report further includes at least one of usage of each modulation scheme, performance of soft handover situations relative to normal situations, a number of acknowledge/non-acknowledge reception errors, or power usage for calculation of power usage of high speed downlink packet access (HSDPA) transmissions versus all other services.

* * * * *